W. A. SCHMIDT & G. C. ROBERTS.
APPARATUS FOR SEPARATING SUSPENDED PARTICLES FROM GASES.
APPLICATION FILED APR. 6, 1914.
1,132,124.
Patented Mar. 16, 1915.
2 SHEETS—SHEET 2.
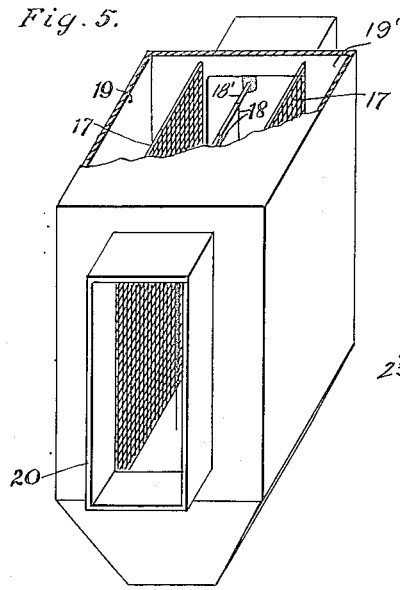
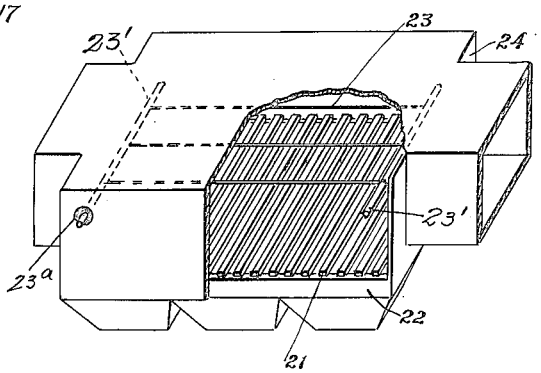
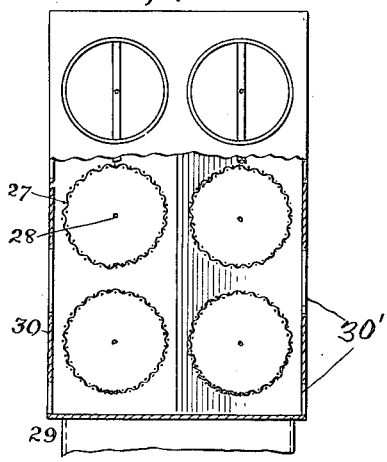
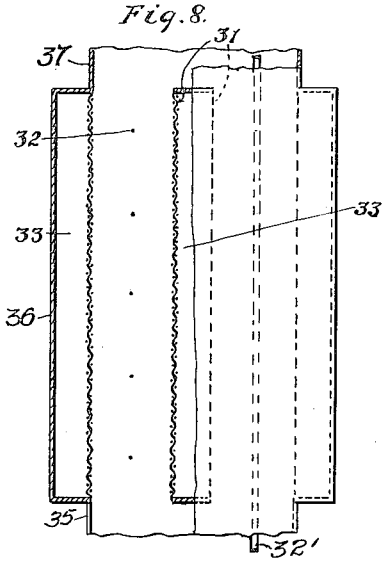
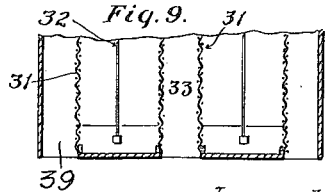
Inventors:
Walter August Schmidt
George Clifford Roberts
by Arthur P. Knight
Atty

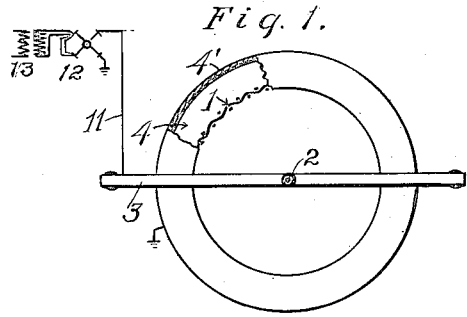
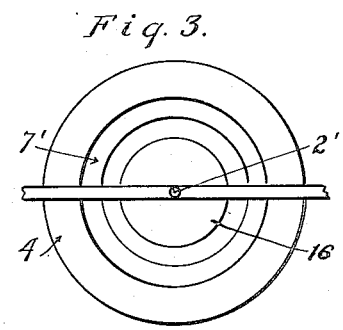
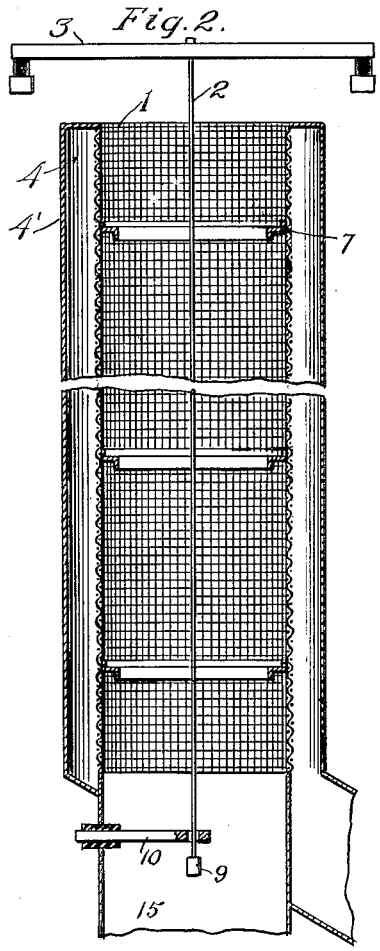
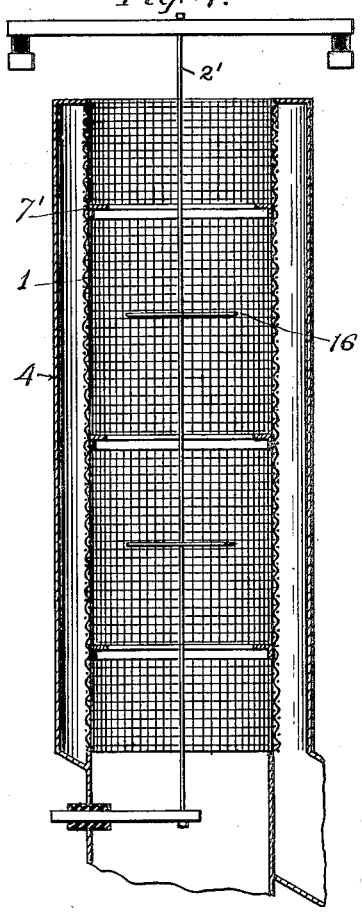

UNITED STATES PATENT OFFICE.

WALTER AUGUST SCHMIDT AND GEORGE CLIFFORD ROBERTS, OF LOS ANGELES, CALIFORNIA, ASSIGNORS TO INTERNATIONAL PRECIPITATION COMPANY, OF LOS ANGELES, CALIFORNIA, A CORPORATION OF CALIFORNIA.

APPARATUS FOR SEPARATING SUSPENDED PARTICLES FROM GASES.

1,132,124.  Specification of Letters Patent.  Patented Mar. 16, 1915.

Application filed April 6, 1914. Serial No. 829,789.

*To all whom it may concern:*

Be it known that we, WALTER AUGUST SCHMIDT and GEORGE CLIFFORD ROBERTS, citizens of the United States, residing at Los Angeles, in the county of Los Angeles and State of California, have invented new and useful Improvements in Apparatus for Separating Suspended Particles from Gases, of which the following is a specification.

This invention relates to apparatus for separating dust, soot, or other solid or liquid particles from gases, by electrical action, and the main object of the invention is to provide apparatus for this purpose which will effect practically complete separation of the suspended particles from the gas, even when the latter is passed through the apparatus with great rapidity.

In apparatus for precipitating dust, etc., from gases, by electrical action, the gases are passed between electrodes which are maintained at a unidirectional potential difference and are so formed as to favor discharge from one set of electrodes, with the result that the particles become charged and are driven by the electrical forces toward the opposing electrodes, here referred to as the collecting electrodes. It is of great importance to avoid, as far as possible, any discharge from the collecting electrodes, as such discharge tends to neutralize, or even reverse the charges of the particles approaching said electrodes, causing the movement of the particles across the current of gas between the electrode to be arrested, or even reversed, and in either case the particles so affected are swept forward by the current of gas, and carried through the apparatus, without precipitation. One of the contributing causes of discharge from the collecting electrodes is the roughening of the surface due to irregular deposition of the suspended matter thereon, giving the effect of a pubescent surface which facilitates discharge. We avoid this action by making the collecting electrodes perforate, so as to permit the gases to pass therethrough, and to carry the suspended matter through the collecting electrodes, and in order to receive and collect the matter so carried through the electrodes, we provide suitable receiving chambers, boxes or chutes, adjacent the electrodes. In order to further minimize the discharge action from the collecting electrodes, we prefer to construct these electrodes as cylindrical surfaces, with the discharge electrodes extending axially therein, such an arrangement resulting in minimum field intensity at the collecting electrodes with corresponding slight ionizing and discharge actions.

Other features and objects of the invention will be hereinafter set forth.

The accompanying drawings illustrate embodiments of the invention, and referring thereto: Figure 1 is a plan view, partly in section, of a treater comprising a single cylindrical collecting electrode and a single discharge electrode constructed according to our invention. Fig. 2 is a vertical section of the treater shown in Fig. 1. Fig. 3 is a plan view of a treater with a modified form of the electrodes. Fig. 4 is a vertical section of the treater shown in Fig. 3. Fig. 5 is a sectional perspective, showing the application of the invention to a collecting electrode having a substantially plane surface. Fig. 6 is a sectional perspective of another form of such application. Fig. 7 is a horizontal section of a form of the invention in which a multiplicity of cylindrical electrodes are used, the spaces between such electrodes being used as collecting chambers. Fig. 8 is a horizontal section showing substantially plane collecting electrodes, with the spaces between the same utilized as collecting chambers, and Fig. 9 is a vertical section thereof.

The treater or apparatus shown in Figs. 1 and 2 comprises a substantially cylindrical collecting electrode 1, formed of wire screen or other suitable perforate material, and a discharge electrode 2 consisting of a fine wire suspended from an insulated support 3 so as to extend axially within the cylindrical electrode 1. A casing or box 4, surrounds the cylindrical electrode 1, providing a collecting chamber between said electrode and casing. Baffle rings 7 are preferably provided on the inner side of the cylindrical screen 1, these rings being, for example, formed as flanges on, or angle rings secured to, the screen member 1, and serving as braces or frame members therefor. The baffles 7 are preferably of L or Z section so as to provide pockets for more effectively retarding the flow of gas adjacent to the collecting electrode.

The discharge electrode is held taut in vertical position by tensioning means, consisting, for example, of a weight 9, and is held from swinging by an insulated retaining bar 10. Suitable means are provided for maintaining, at the electrodes 1 and 2, a potential difference sufficient to produce ionization and discharge at the electrode 2. For this purpose said electrode is connected by wire 11 to a rectifier 12, which is adapted to rectify high tension alternating current supplied thereto from a step-up transformer 13, connected to an alternating current supply circuit. The collecting electrode 1 may be grounded, the circuit being completed by ground connections at the rectifier.

The operation is as follows: The gas to be cleaned is passed longitudinally through the cylindrical electrode 1, from the flue or stack 15, and the electrodes 1 and 2 are maintained at a potential difference sufficient to cause ionization of the gas adjacent to the discharge electrode 2. This electrode being of fine wire presents a small surface, with the result that the electric field is concentrated and presents high intensity adjacent thereto, with correspondingly strong ionization. The collecting electrode, on the other hand presents a relatively very large area, with correspondingly small field intensity, and as it is everywhere concentric with the discharge electrode a strong field may be maintained without concentration thereof at any part of this electrode. This form of the collecting electrodes is therefore conducive to minimum ionization thereat, with the result that the interference with migration of the particles toward this electrode, under the action of the electric field, is correspondingly minimized. The particles suspended in the gas as they become charged by the discharge at the electrode 2 are driven transversely of the current of gas, toward the collecting electrode 1, and their velocity, together with the effect of electric windage from the discharge electrode, is sufficient to cause them to pass through the openings or perforations in said electrode and to collect in the box or casing 4 behind the perforate surface of the electrode. The matter passing into the box may fall out of the open lower end of the box into suitable receiving means, or it may be removed from time to time by any suitable means.

As shown in Figs. 3 and 4, the ionizing electrode may consist of disks or rings 16, carried by a vertical wire or rod 2', and extending parallel to the horizontal baffle rings 7', which in this case are shown as simple flanges or angle iron rings secured to the cylindrical screen electrode 1, the construction being otherwise as above described.

An important feature of our invention is the box-electrode with perforate front, which enables the suspended matter to be collected on the back instead of the front of the collecting electrodes, thereby leaving the front of these electrodes clean and enabling the apparatus to operate continuously without the hindrance to precipitation due to "furring" or roughening of the surface thereof by irregular deposits. The principle of the box-electrode may also be applied to electrodes of substantially plane surface, as shown in Fig. 5, wherein 17 are substantially plane electrodes of wire fabric or other perforate material, 18, the opposing discharge electrodes formed as fine wires hung from an insulating conducting rod 18', said electrodes 18 being between the electrodes 17, and a box or casing 19 being provided outside of or around the screen electrodes to form collecting chambers 19' at the back of the respective screen electrodes 17 for collecting the precipitated matter. The gas to be cleaned is caused to pass between the electrodes 17 and 18, a suitable flue 20 being provided to direct the gas from a stack or flue to the space between the electrodes.

As shown in Fig. 6, the perforate collecting electrode may consist of bars 21 extending across the front or top of the collecting box 22, the slots between these bars permitting passage of the gases and suspended matter to the interior of the box. The box in this case is shown as arranged horizontally, with the discharge electrodes 23 extending horizontally over the collecting electrode and within a gas-directing flue 24. These discharge electrodes 23 are formed as wires extending between rods 23' supported by insulating means 23ᵃ.

In case a plurality of collecting electrodes are used they may be arranged as shown in Fig. 7 so that the spaces between these electrodes serve as collecting chambers. Each of the electrodes 27 in this figure is a cylindrical screen, with a discharge electrode 28 extending axially therein, all of the cylindrical members 27 communicating with a flue 29 for conducting the dust laden gas thereto, and the entire system of electrodes being inclosed in a casing 30 which receives the dust or other solid matter forced through the screen electrodes by the electrical action. Said casing is shown as provided with openings 30' to enable the collected material to escape or to be drawn off.

In the form of the invention shown in Figs. 8 and 9, a plurality of plane screen electrodes 31 are arranged in parallelism in an inclosing casing 36, whose walls form dead air chambers 33 at the outer side of the outer screen electrodes and between the intermediate screen electrodes, and inlet and outlet flues 35 and 37 are provided for conducting the gas to be treated between opposing pairs of electrodes 31. Discharge electrodes 32, in the form of wires hung from insulated rods one of which is shown at 32', extend between the two electrodes 31 of each pair, so as to produce electrical discharge into the gas passing between such electrodes 31, and to drive the suspended particles toward and through such electrodes 31 and into the collecting chambers 33, these collecting chambers having openings 39, see Fig. 9, through which the collected material may be removed.

We prefer to make the screen or perforate electrodes 1 with perforations sufficiently large to permit free passage of the suspended particles through the same, but in case the precipitated material is of such a nature as to clog the perforations, it may be removed continuously or from time to time, by scraping, jarring, washing, or otherwise. In any case, however, our invention provides a box or receiver at the outside of the screen electrode, that is to say, on the side thereof which is farther away from the discharge electrode, said box or receiver so inclosing the electrodes as to prevent the current of gas from flowing through the screen, forming a dead air chamber which is outside of the current of gas passing through the apparatus, in which chamber the particles driven through the screen may collect.

What we claim is:

1. In an apparatus for separating suspended particles from gases, the combination of a screen electrode, a discharge electrode at one side of said screen electrode, a collecting chamber at the other side of said screen electrode, means for conducting a current of gas to be treated between said discharge electrode and said screen electrode, and means for applying high tension current to said electrodes to cause the particles suspended in the gas to be forced through the screen into the collecting chamber, said collecting chamber having an inclosing wall preventing the current of gas from passing through the screen electrode.

2. In an apparatus for separating suspended particles from gases, the combination of a screen electrode, a discharge electrode at one side of said screen electrode, an inclosing wall forming a dead-air chamber at the other side of said screen electrode, inlet and outlet means communicating with the space between the discharge and screen electrodes, to conduct a current of gas through such space without passage of the gas through the screen electrode, and means for applying high tension current to said electrodes to force the particles in the gas through the screen electrode and into said chamber.

3. In an apparatus for separating suspended particles from gases, the combination of a cylindrical screen electrode provided with inlet means at one end for supply of the gas to be treated, and with outlet means at the other end for discharge of the treated gas, a collecting chamber extending around said cylindrical screen electrode and outside of the current of gas passing within said screen electrode, a discharge electrode extending longitudinally within said screen electrode, and means for applying high tension current to said electrodes to cause the particles in the gas to be forced through the screen electrode into said collecting chamber.

4. In an apparatus for separating suspended particles from gases, the combination of a cylindrical screen electrode, open at both ends for passage of a current of gas longitudinally within the same, a discharge electrode extending axially within said cylindrical screen electrode, and a collecting chamber extending around said cylindrical screen electrode, and having an inclosing wall preventing the current of gas from flowing through the perforations of said screen electrode.

5. An apparatus for separating suspended particles from gases, comprising a cylindrical screen electrode open at both ends for passage of a current of gas longitudinally therethrough, a discharge electrode extending within said screen electrode, a collecting chamber extending around said cylindrical screen electrode and having an inclosing wall preventing the current of gas from passing through the perforations of said screen electrode, and baffle rings projecting inwardly from said screen electrode.

WALTER AUGUST SCHMIDT.
GEORGE CLIFFORD ROBERTS.

Witnesses:
WM. N. DREW,
H. M. MOSHER.